(12) United States Patent
Watanabe et al.

(10) Patent No.: US 7,836,235 B2
(45) Date of Patent: Nov. 16, 2010

(54) RESOURCE MANAGEMENT DEVICE

(75) Inventors: Yoshiharu Watanabe, Kyoto (JP); Seiji Horii, Osaka (JP); Daisuke Murakami, Kyoto (JP); Yuji Takai, Osaka (JP)

(73) Assignee: Panasonic Corpoation, Osaka (JP)

( * ) Notice: Subject to any disclaimer, the term of this patent is extended or adjusted under 35 U.S.C. 154(b) by 266 days.

(21) Appl. No.: 11/889,539

(22) Filed: Aug. 14, 2007

(65) Prior Publication Data

US 2008/0065802 A1 Mar. 13, 2008

(30) Foreign Application Priority Data

Sep. 13, 2006 (JP) .............................. 2006-247902

(51) Int. Cl.
*G06F 12/00* (2006.01)
(52) U.S. Cl. ........................ 710/240; 710/241; 710/243; 710/244
(58) Field of Classification Search ......... 710/240–241, 710/243–244
See application file for complete search history.

(56) References Cited

U.S. PATENT DOCUMENTS

| | | | |
|---|---|---|---|
| 5,343,474 A * | 8/1994 | Driscoll | 370/461 |
| 6,249,847 B1 * | 6/2001 | Chin et al. | 711/151 |
| 6,738,845 B1 * | 5/2004 | Hadwiger et al. | 710/240 |
| 7,231,475 B1 * | 6/2007 | Singla et al. | 710/117 |
| 2004/0073730 A1 | 4/2004 | Horii et al. | |
| 2005/0071210 A1 * | 3/2005 | Gish et al. | 705/8 |
| 2005/0080967 A1 * | 4/2005 | Ries et al. | 710/240 |
| 2006/0155903 A1 | 7/2006 | Soga et al. | |
| 2009/0006692 A1 * | 1/2009 | Blumrich et al. | 710/244 |

* cited by examiner

*Primary Examiner*—Mark Rinehart
*Assistant Examiner*—Nimesh G Patel
(74) *Attorney, Agent, or Firm*—McDermott Will & Emery LLP

(57) ABSTRACT

An access request arbitration section, a data amount management section and a resource control section are provided between a plurality of masters and a shared resource. The data amount management section manages access data amounts passing between the plurality of masters and the resource. The access request arbitration section executes arbitrary arbitration of issuing access permission to a master determined according to the access data amount at any timing, in addition to periodic arbitration of issuing access permission to any of the masters at fixed-interval arbitration timing. If an access request of less than a defined data amount is granted in periodic arbitration, the remaining access chance can be used in arbitrary arbitration.

15 Claims, 13 Drawing Sheets

RESOURCE MANAGEMENT DEVICE

BACKGROUND OF THE INVENTION

The present invention relates to a resource management device, used in a system in which a plurality of masters issue requests for access to at least one shared resource, for arbitrating such access requests from the masters to a shared resource.

Inside a system LSI, a plurality of masters such as a microprocessor, a digital signal processor (DSP) and a direct memory access (DMA) controller make access to shared resources such as a memory and a peripheral input/output (I/O) controller. In such a system LSI, a resource management device is necessary for arbitrating access requests from the masters to the shared resource efficiently.

In some prior art technique, a resource management device arbitrates access requests at each fixed time interval based on priority information of masters held in advance in the form of a table. The table includes a plurality of patterns of priority information, and the patterns are sequentially selected at fixed time intervals of the arbitration. Each master is allowed to receive access permission by the number of times equal to the number of priority patterns that assign the highest priority to the master, so that a minimum access bandwidth can be guaranteed for each master (see US 2004/0073730 A1).

In the device described above, if a temporal deviation arises in the timing of issuance of access requests from the masters, no access permission will be granted to any master at an arbitration timing at which no access request exists, resulting in losing a chance of granting access permission. As a result, a number of access requests may cluster at another arbitration timing. In this case, the access latency of a master having a low priority will increase.

To solve the above problem, in another prior art technique, while arbitration of access requests from masters to a shared resource is being made at fixed-interval arbitration timing, the timing of start of the arbitration operation is shifted from the fixed-interval arbitration timing according to an arbitration history. To state more specifically, if no access request from any master exists at a given arbitration timing, access permission will be given to an access request issued after the given arbitration timing without waiting for the next arbitration timing (see US 2006/0155903 A1).

SUMMARY OF THE INVENTION

In recording/playback systems for digital TV broadcasting and cellular phones, some masters may request a large amount of data for a short time while others may request a small amount of data frequently. A same master may request a large amount of data on some occasions and request a small amount of data on others.

In the conventional resource management devices described above in which access requests to a shared resource are arbitrated at fixed time intervals, assume that the interval of the arbitration timing is T and the shared resource can transfer data of 32 bytes, for example, during the interval T. If a master makes a request for data of only 16 bytes at any arbitration timing allocated thereto and is granted access for each request, the access chance of the remaining 16 bytes will be lost at each arbitration timing. Also, if the priority information is set based on the premise that the access request amounts of all masters are invariably 32 bytes, the highest priority must be assigned to the master a larger number of times than that actually required to guarantee the access bandwidth for the master. This will increase the access wait time of the other masters.

An object of the present invention is improving the access efficiency and the access latency considering that the access request amounts of masters are not uniform, in a system in which access requests to a shared resource are arbitrated at fixed time intervals.

To attain the above object, according to the present invention, provided is a data amount management section for managing the access data amounts passing between a plurality of masters and a shared resource. An access request arbitration section executes arbitrary arbitration of issuing access permission to a master determined based on the access data amount at any timing, in addition to periodic arbitration of issuing access permission to any of the masters at fixed-interval arbitration timing.

To state more specifically, the data management section operates to initialize an accessible amount managed for each of the plurality of masters, and thereafter in the case of the periodic arbitration, increases the accessible amount for an access-granted master by a defined data amount and then decreases the resultant accessible amount by the equivalent of the access request amount of the access-granted master, or in the case of the arbitrary arbitration, decreases the accessible amount for an access-granted master by the equivalent of the access request amount of the access-granted master. In the arbitrary arbitration, the access request arbitration section issues access permission to a master presenting an access request amount that does not exceed the accessible amount managed by the data amount management section.

According to the present invention, if an access request of less than a defined data amount is granted in the periodic arbitration, the remaining access chance can be used in the arbitrary arbitration. This improves the access efficiency and access latency of a system in which the access request amounts of masters are not uniform.

DESCRIPTION OF THE PREFERRED EMBODIMENTS

Hereinafter, preferred embodiments of the present invention will be described with reference to the accompanying drawings.

Figure 1:
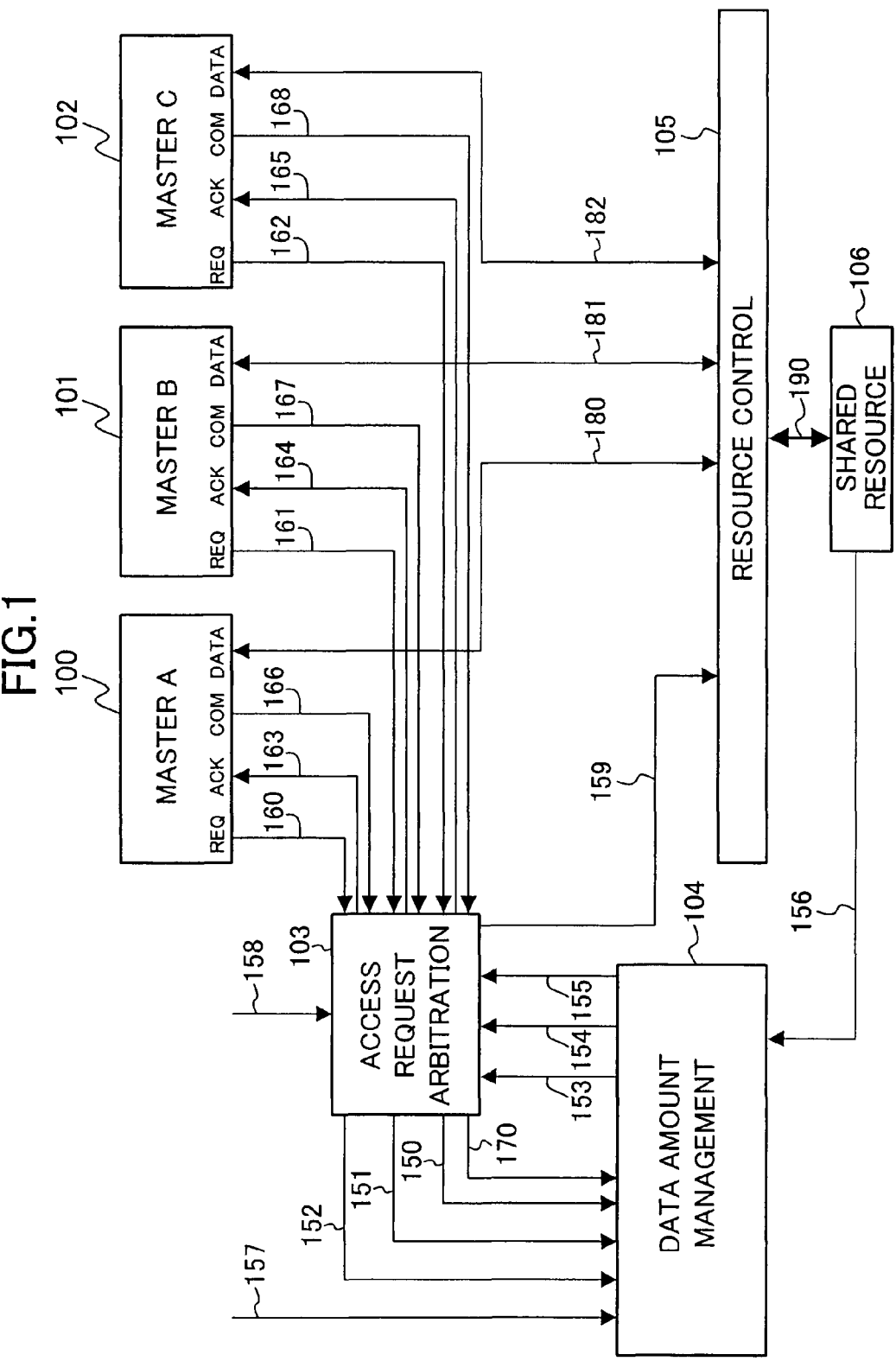
FIG. 1 is a block diagram of a system including a resource management device of the present invention.

FIG. 1 shows an exemplary configuration of a system including a resource management device of the present invention. The system of FIG. 1 includes masters 100, 101 and 102, an access request arbitration section 103, a data amount management section 104, a resource control section 105 and a shared resource 106.

Each of the masters 100 to 102 may be a microprocessor, a DSP, a DMA controller or the like. The shared resource 106 may be a memory, a peripheral I/O controller or the like. In the following description, the masters 100, 101 and 102 are also called masters A, B and C, respectively, as appropriate.

The access request arbitration section 103, the data amount management section 104 and the resource control section 105 interposed between the masters A, B and C and the shared resource 106 constitute the resource management device. The access request arbitration section 103 arbitrates access requests from the masters A, B and C that intend to access the shared resource 106. The resource control section 105 controls passing of data between a master granted access by the access request arbitration section 103 and the shared resource 106. The data amount management section 104 manages the access data amounts passing between the masters A, B and C and the shared resource 106. The reference numeral 156 denotes an interrupt signal issued from the shared resource 106 to the data amount management section 104, 157 denotes program input into the data amount management section 104, and 158 denotes program input into the access request arbitration section 103.

To describe in more detail, the access request arbitration section 103 arbitrates access requests (REQ) 160, 161 and 162 from the masters A, B and C, to determine to which master among the masters A, B and C access permission or acknowledgment (ACK) 163, 164 or 165 should be issued. A master that has granted access permission (ACK) issues an access command (COM) 166, 167 or 168 including information on the access request amount to the access request arbitration section 103. In response to this, the access request arbitration section 103 sends an access command 159 of the access-granted master to the resource control section 105. The access-granted master then receives/transmits data from/to the resource control section 105 via a transfer data bus 180, 181 or 182, and the resource control section 105 receives/transmits data from/to the shared resource 106 via a resource transfer data bus 190. The resource control section 105 controls the access to the shared resource 106 based on the characteristics of the shared resource 106, that is, based on the memory type and the access mode type if the shared resource 106 is a memory.

The data amount management section 104, which manages the accessible amounts for the masters A, B and C as part of the access data amount management, notifies the access request arbitration section 103 of accessible amounts 153, 154 and 155 for the masters.

The access request arbitration section 103 executes periodic arbitration of issuing access permission at fixed-interval arbitration timing and arbitrary arbitration of issuing access permission at arbitrary timing. In the periodic arbitration, access permission is issued to a master among the masters A, B and C determined according to a priority pattern as described above. In the arbitrary arbitration, access permission is issued to a master among the masters A, B and C that has presented an access request amount not exceeding the corresponding accessible amount managed by the data amount management section 104.

An arbitration timing signal 170 representing fixed-interval timing in the periodic arbitration is supplied from the access request arbitration section 103 to the data amount management section 104. Also supplied from the access request arbitration section 103 to the data amount management section 104 are an ID 150 of the access-granted master, an access request amount 151 of the access-granted master, and an arbitration type 152 indicating the periodic arbitration or the arbitrary arbitration based on which the current access permission has been issued. The data amount management section 104 operates to increase the accessible amount for the access-granted master by a defined data amount and then decreases the resultant accessible amount by the equivalent of the access request amount of the master in the case of the periodic arbitration, or decrease the accessible amount of the access-granted master by the equivalent of the access request amount of the master in the case of the arbitrary arbitration.

Figure 2:
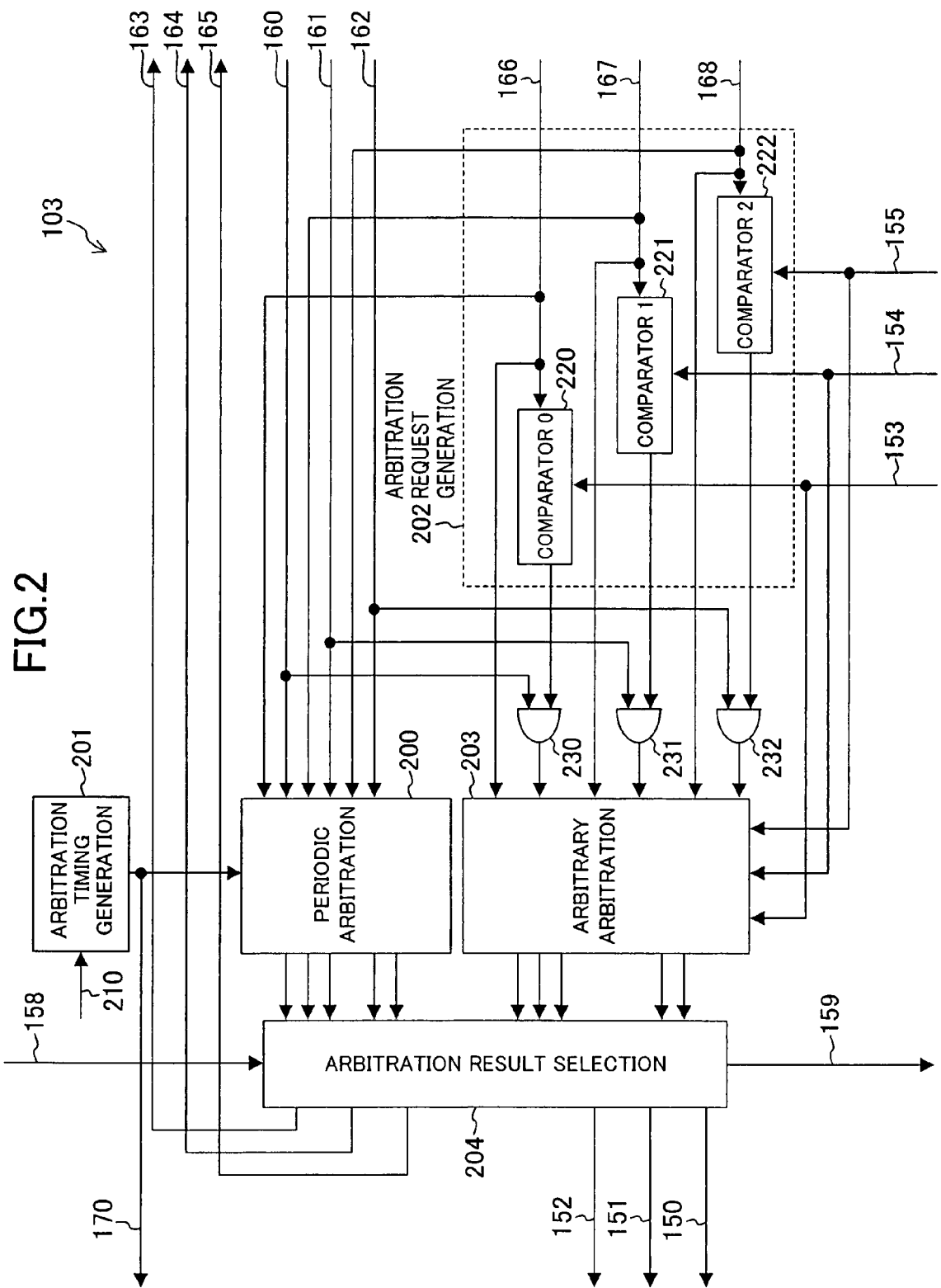
FIG. 2 is a block diagram of an access request arbitration section in FIG. 1.

FIG. 2 shows an exemplary internal configuration of the access request arbitration section 103 in FIG. 1. The access request arbitration section 103 includes a periodic arbitration portion 200, an arbitration timing generation portion 201, an arbitration request generation portion 202 accompanied by three AND gates 230, 231 and 232, an arbitrary arbitration portion 203 and an arbitration result selection portion 204.

The arbitration timing generation portion 201 frequency-divides a clock signal 201 to generate the arbitration timing signal 170, which is outputted to the periodic arbitration portion 200 and the data amount management section 104.

The periodic arbitration portion 200, receiving the arbitration timing signal 170 and the access requests 160, 161 and 162 and the access commands 166, 167 and 168 from the masters, arbitrates the access requests 160, 161 and 162 from the masters according to the priority information at the fixed-interval arbitration timing indicated by the arbitration timing signal 170. The access permission to be given to the access-granted master, the ID of the access-granted master, the access command from the access-granted master obtained as a result of the periodic arbitration are sent to the arbitration result selection portion 204.

The arbitration request generation portion 202, provided with three comparators 220, 221 and 222, compares the accessible amounts 153, 154 and 155 for the masters sent from the data amount management section 104 with the access request amounts obtained from the access commands 166, 167 and 168 of the masters, respectively, and issues an arbitration request for a master whose access request amount is not more than the corresponding accessible amount to the arbitrary arbitration portion 203. The AND gates 230, 231 and 232 control the arbitrary arbitration portion 203 so that arbitration be made for a master for which both the access request 160, 161 or 162 from the master and the arbitration request from the arbitration request generation portion 202 have been issued.

The arbitrary arbitration portion 203 processes the arbitration request received from the arbitration request generation section 202 via the AND gate 230, 231 or 232 at arbitrary timing independent of the arbitration timing signal 170. The access permission to be given to the access-granted master, the ID of the access-granted master, the access command from the access-granted master obtained as a result of the arbitrary arbitration are sent to the arbitration result selection portion 204. Note that if receiving a plurality of arbitration requests via the AND gates 230, 231 and 232 simultaneously, the arbitrary arbitration portion 203 determines a single access-granted master according to a predetermined priority rule as will be described later.

If receiving the arbitration result only from the periodic arbitration portion 200, the arbitration result selection portion 204 issues one of the access permissions 163, 164 and 165 to the access-granted master based on the arbitration result, and also issues the ID 150 of the access-granted master, the access request amount 151 of the access-granted master and the arbitration type 152 of "1" indicating the periodic arbitration to the data amount management section 104 and the access command 159 from the access-granted master to the resource control section 105. If receiving the arbitration result only from the arbitrary arbitration portion 203, the arbitration result selection portion 204 issues one of the access permissions 163, 164 and 165 to the access-granted master based on the arbitration result, and also issues the ID 150 of the access-granted master, the access request amount 151 of the access-granted master and the arbitration type 152 of "0" indicating the arbitrary arbitration to the data amount management section 104 and the access command 159 from the access-granted master to the resource control section 105.

If the timing coincides between the periodic arbitration and the arbitrary arbitration, it is necessary to determine which type of arbitration should be enabled to select the arbitration result. The arbitration result selection portion 204 therefore receives the program input (arbitration result selection signal) 158 indicating which type, the periodic arbitration or the arbitrary arbitration, should be enabled. Alternatively, setting may be made to give priority to the periodic arbitration or the arbitrary arbitration at all times.

Figure 3:
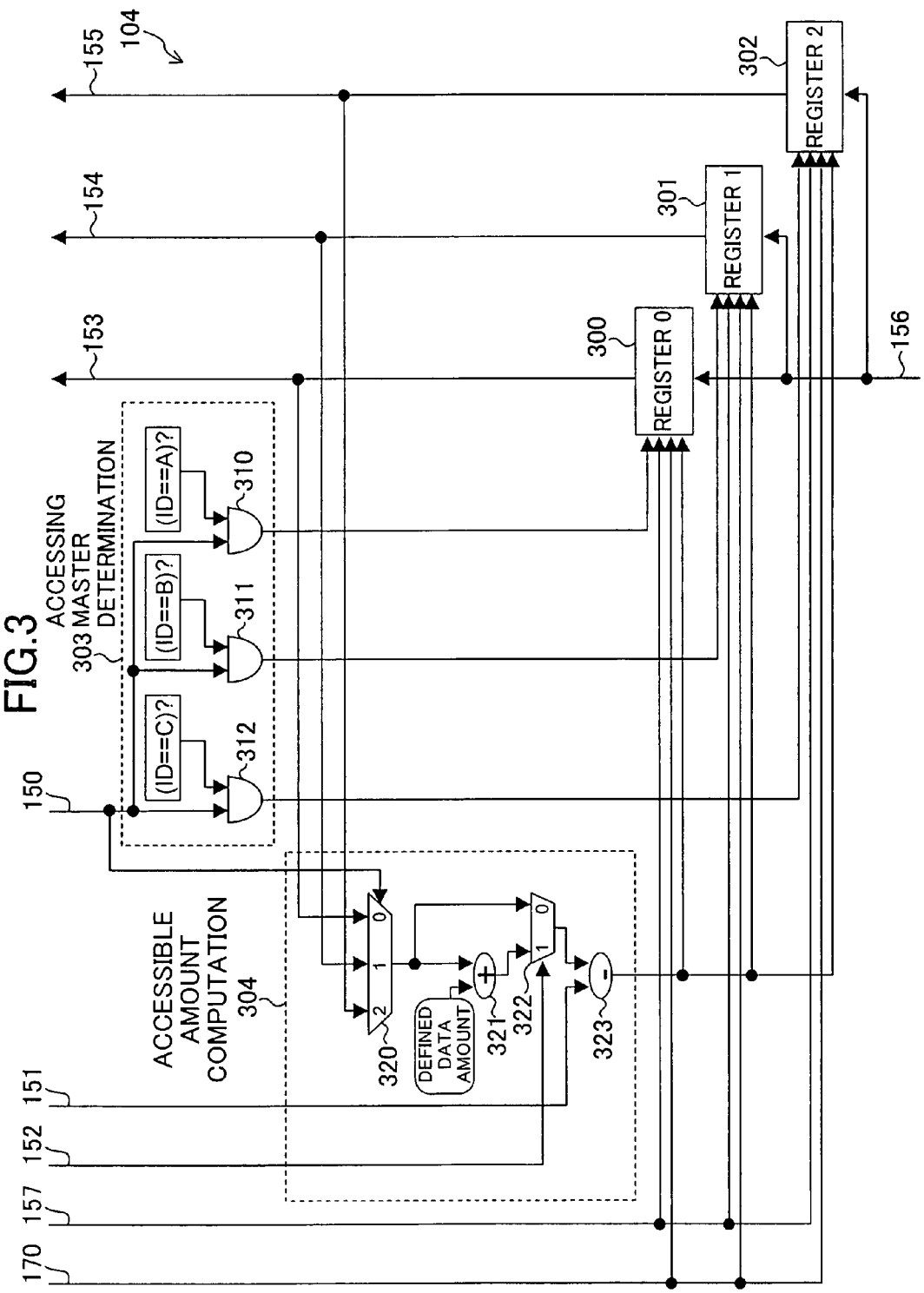
FIG. 3 is a block diagram of a data amount management section in FIG. 1.

FIG. 3 shows an exemplary internal configuration of the data amount management section 104 in FIG. 1. As shown in FIG. 3, the data amount management section 104 includes accessible amount registers 300, 301 and 302, an accessing master determination portion 303 and an accessible amount computation portion 304.

The accessible amount registers 300, 301 and 302 respectively manage the accessible amounts 153, 154 and 155 for the masters, and can be initialized in response to the interrupt signal 156 from the shared resource 106 and the program input (register initialization signal) 157, for example.

The accessing master determination portion 303, provided with three AND gates 310, 311 and 312, for example, identifies the access-granted master based on the ID 150 of the access-granted master obtained from the access request arbitration section 103, and outputs a data load signal to the accessible amount register 300, 301 or 302 corresponding to the access-granted master.

The accessible amount computation portion 304, provided with an input selector 320, an adder 321, an arbitration type selector 322 and a subtracter 323, selects a valid accessible amount from the accessible amount registers 300, 301 and 302 based on the ID 150 of the access-granted master, for computation. If the arbitration type 152 for access permission is "1", that is, if the access permission has been made based on the periodic arbitration, the accessible amount computation portion 304 adds a data amount defined for one access permission (32 bytes, for example) to the current accessible amount, subtracts the access request amount 151 of the access-granted master from the added result, and supplies the subtracted result to the corresponding accessible amount register 300, 301 or 302 as the accessible amount for the next cycle. If the arbitration type 152 for access permission is "0", that is, if the access permission has been made based on the arbitrary arbitration at arbitrary timing, the accessible amount computation portion 304 subtracts the access request amount 151 of the access-granted master from the current accessible amount, and supplies the subtracted result to the corresponding accessible amount register 300, 301 or 302 as the accessible amount for the next cycle.

Hereinafter, specific examples of operation of the resource management device of this embodiment configured as described above will be described. In the following specific examples, assume that a master is granted 32 bytes in arbitration timing-based access permission in the access request arbitration section 103, that is, the "defined data amount" in FIG. 3 is 32 bytes.

Figure 4:
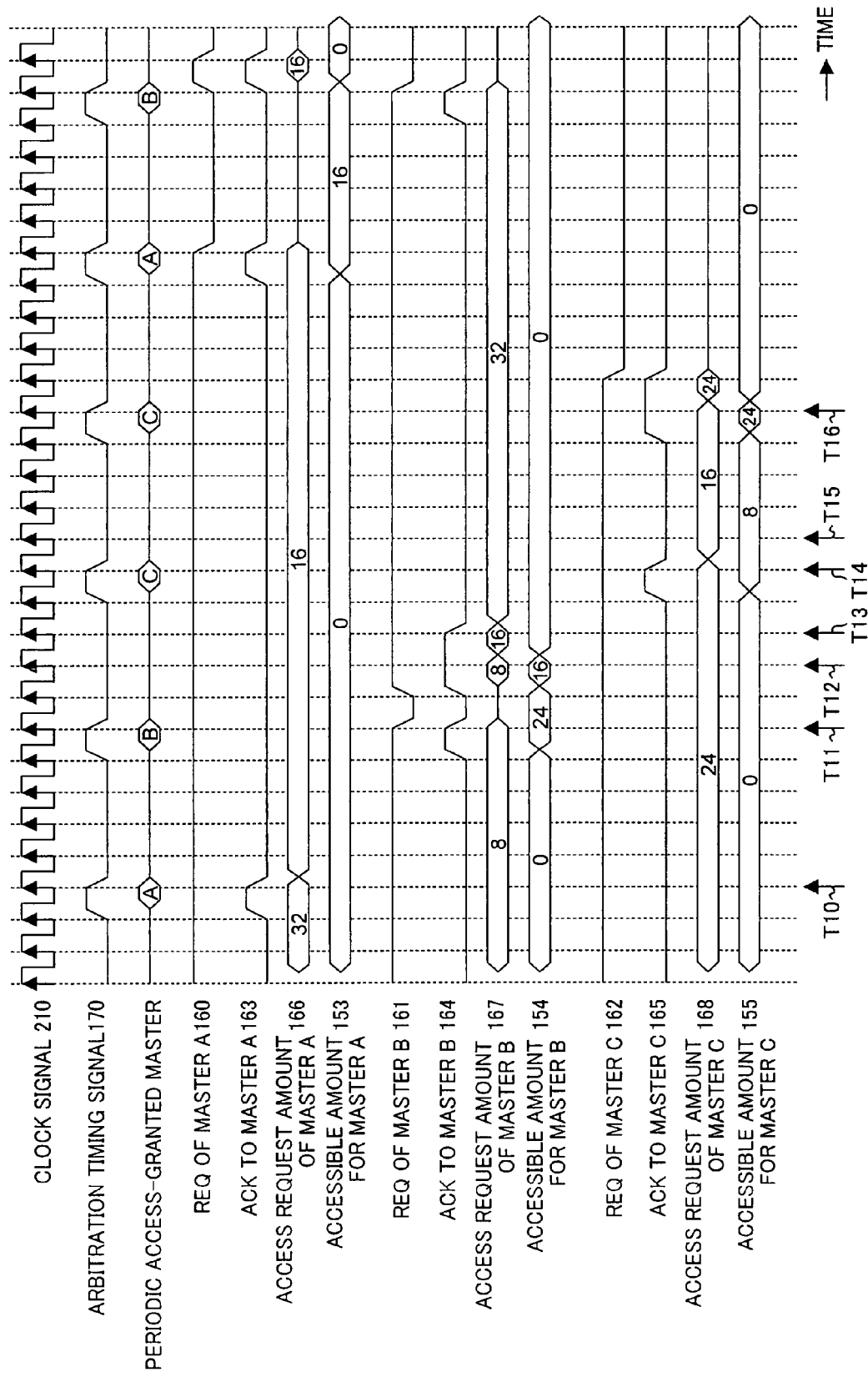
FIG. 4 is a timing chart showing a first example of operation of the resource management device of FIG. 1.

FIG. 4 shows a first example of operation of the resource management device of FIG. 1. Note herein that the clock signal 210 is frequency-divided by five to give the arbitration timing signal 170.

Referring to FIG. 4, all the accessible amounts 153, 154 and 155 for the masters A, B and C have been initialized to "0". In this state, the master A receives the access permission 163 under the periodic arbitration at T10. While the master A is granted 32 bytes in this access permission, the access request amount 166 of the master A is 32 bytes. The accessible amount 153 for the master A at T10 therefore becomes 0 (=0+32−32) bytes.

At T11, the master B receives the access permission 164 under the periodic arbitration. While the master B is granted 32 bytes in this access permission, the access request amount 167 of the master B is 8 bytes. The accessible amount 154 for the master B at T11 therefore becomes 24 (=0+32−8) bytes.

At T12, the master B issues the access request 161. With the access request amount 167 indicating 8 bytes and the accessible amount 154 for the master B indicating 24 bytes, the arbitration request generation portion 202 judges that the access request amount 167 is not more than the accessible amount 154, and thus issues the access permission 164 to the master B under the arbitrary arbitration although T12 does not coincide with the arbitration timing. The accessible amount 154 for the master B then decreases from 24 bytes to 16 (=24−8) bytes.

Likewise, at T13, with the access request amount 167 of the master B being not more than the accessible amount 154, the access permission 164 is issued to the master B under the arbitrary arbitration although T13 does not coincide with the arbitration timing. The accessible amount 154 for the master B then decreases to 0 (=16−16) bytes.

At T14, the master C receives the access permission 165 under the periodic arbitration. While the master C is granted 32 bytes in this access permission, the access request amount 168 of the master C is 24 bytes. The accessible amount 155 for the master C at T14 therefore becomes 8 (=0+32−24) bytes.

At next T15, the master C issues the access request 162. However, since the access request amount 168 is 16 bytes while the accessible amount 155 for the master C is 8 bytes, the access permission 165 is not issued to the master C at T15, but is postponed until the next arbitration timing, T16.

At T16, the master C receives the access permission 165 of 32 bytes. With the access request amount 168 being 16 bytes and the current accessible amount 155 indicating 8 bytes, the accessible amount 155 for the master C at T16 becomes 24 (=8+32−16) bytes.

The access permission 165 to the master C may be issued at T15. That is, since the accessible amount 155 for the master C at T15 is 8 bytes, the access request amount 168 of 16 bytes of the master C may be divided into two access requests of 8 bytes each, so that only one 8-byte access request can be permitted earlier at T15. The remaining 8-byte access request may be permitted at T16, for example.

If each of the accessible amounts 153, 154 and 155 for the masters is accumulated to an excessively large value, the arbitrary arbitration portion 203 may possibly fail to operate correctly. In consideration of this, the accessible amounts 153, 154 and 155 may desirably be initialized under fixed conditions.

Figure 5:
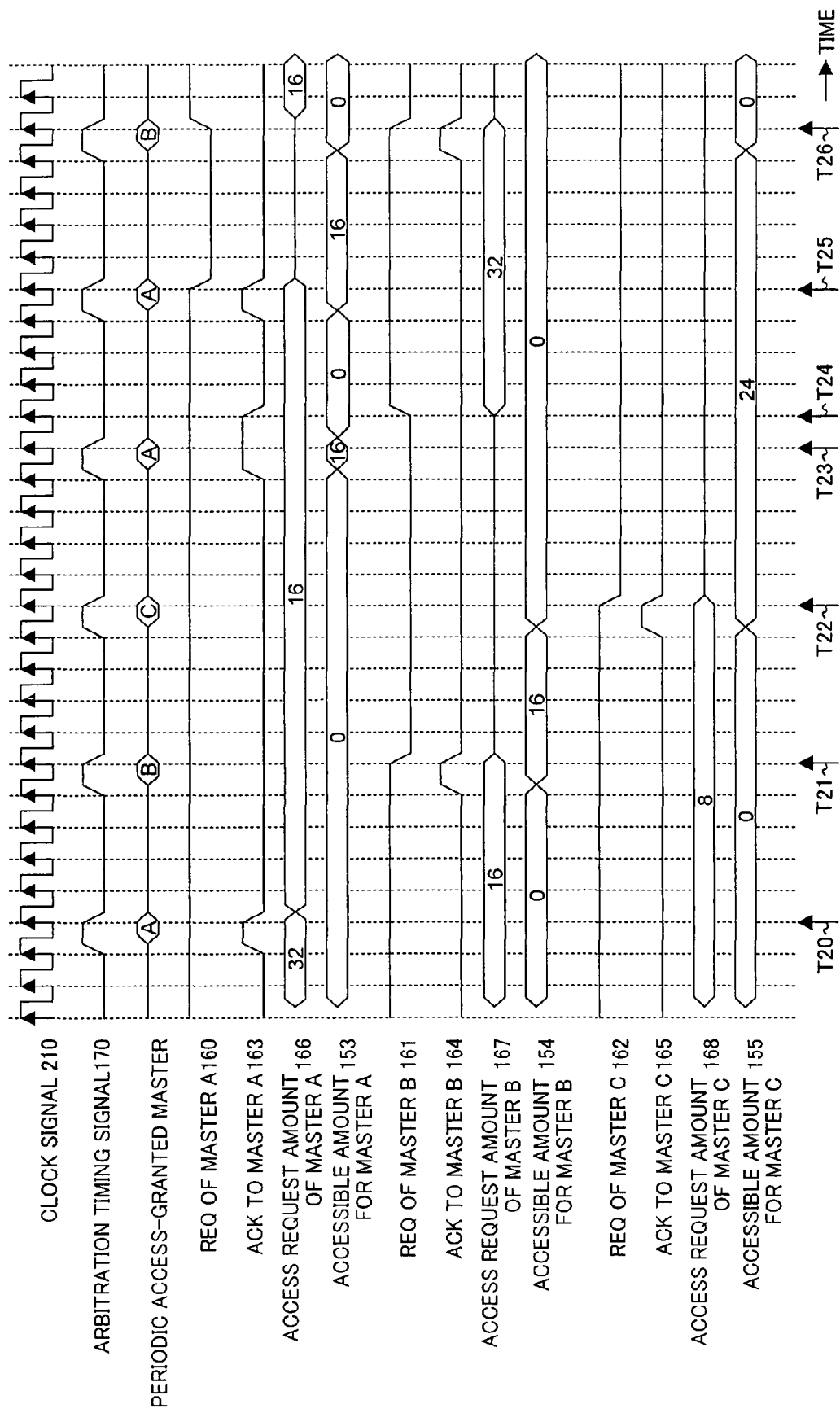
FIG. 5 is a timing chart showing a second example of operation of the resource management device of FIG. 1.

FIG. 5 shows a second example of operation of the resource management device of FIG. 1. In this example, the accessible amounts 153, 154 and 155 are initialized every third arbitration timing.

Referring to FIG. 5, at T20, the master A receives the access permission 163 under the periodic arbitration. Assume that this arbitration at the arbitration timing T20 is called first arbitration.

At T21, the master B receives the access permission 164 under the periodic arbitration. While the master B is granted 32 bytes in this access permission, the access request amount 167 of the master B is 16 bytes. The accessible amount 154 for the master B at T21 therefore becomes 16 bytes.

At T22, the master C receives the access permission 165 under the periodic arbitration. While the master C is granted 32 bytes in this access permission, the access request amount 168 of the master C is 8 bytes. The accessible amount 155 for the master C at T22 therefore becomes 24 bytes.

At T22, which is the third arbitration timing as counted from T20 as the first arbitration timing, the accessible amounts 153 and 154 for the masters A and B that are not granted access at T22 are initialized to 0 bytes.

At T23, the master A receives the access permission 163 under the periodic arbitration. While the master A is granted 32 bytes in this access permission, the access request amount 166 of the master A is 16 bytes. The accessible amount 153 for the master A at T23 therefore becomes 16 bytes.

At T24, the master A issues the access request 160. With the access request amount 166 of the access A being 16 bytes and the accessible amount 153 for the master A indicating 16 bytes, the arbitration request generation portion 202 determines that the access request amount 166 is not more than the accessible amount 153. As a result, the access permission 163 is issued to the master A under the arbitrary arbitration although T24 does not coincide with the arbitration timing. The accessible amount 153 for the master A then decreases from 16 bytes to 0 bytes.

At T25, the master A receives the access permission 163 under the periodic arbitration. While the master A is granted 32 bytes in this access permission, the access request amount 166 of the master A is 16 bytes. The accessible amount 153 for the master A at T25 therefore becomes 16 bytes.

At T26, the master B receives the access permission 164 under the periodic arbitration. While the master B is granted 32 bytes in this access permission, the access request amount 167 of the master B is 32 bytes. The accessible amount 154 for the master B at T26 therefore becomes 0 bytes.

At T26, which is the third arbitration timing as counted from T23 as the first arbitrating timing, the accessible amounts 153 and 155 for the masters A and C that are not granted access at T26 are initialized to 0 bytes.

Figure 6:
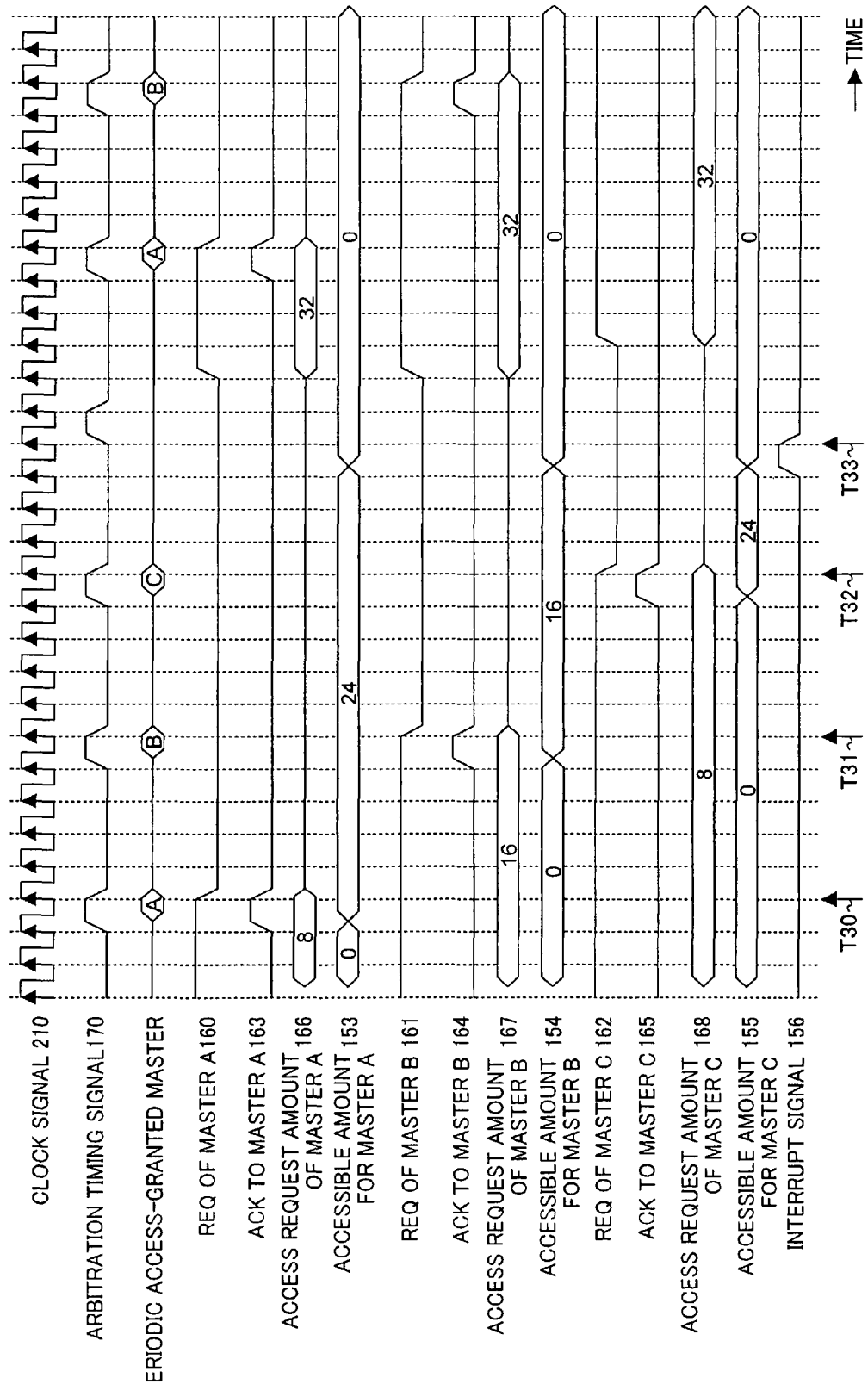
FIG. 6 is a timing chart showing a third example of operation of the resource management device of FIG. 1.

FIG. 6 shows a third example of operation of the resource management device of FIG. 1. In this example, the accessible amounts 153, 154 and 155 are initialized with the interrupt signal 156 from the shared resource 106.

Referring to FIG. 6, at T30, the master A receives the access permission 163 under the periodic arbitration. While the master A is granted 32 bytes in this access permission, the access request amount 166 of the master A is 8 bytes. The accessible amount 153 for the master A at T30 therefore becomes 24 bytes.

At T31, the master B receives the access permission 164 under the periodic arbitration. While the master B is granted 32 bytes in this access permission, the access request amount 167 of the master B is 16 bytes. The accessible amount 154 for the master B at T31 therefore becomes 16 bytes.

At T32, the master C receives the access permission 165 under periodic arbitration. While the master C is granted 32 bytes in this access permission, the access request amount 168 of the master C is 8 bytes. The accessible amount 155 for the master C at T32 therefore becomes 24 bytes.

At T33, the shared resource 106 issues the interrupt signal 156 to the accessible amount registers 300, 301 and 302. With this interrupt signal 156, the accessible amount registers 300, 301 and 302 are initialized from their respective values to 0 bytes.

Figure 7:
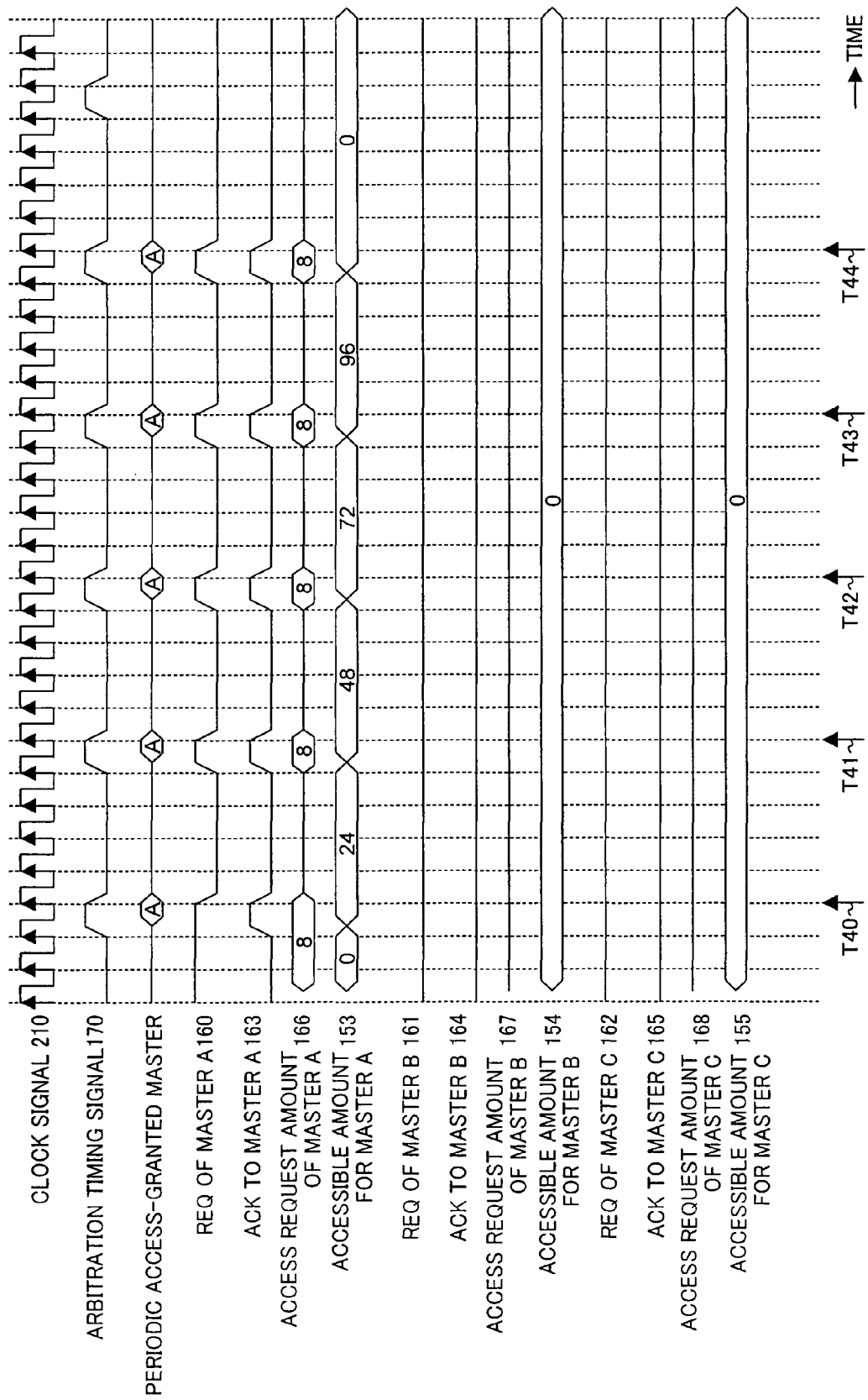
FIG. 7 is a timing chart showing a fourth example of operation of the resource management device of FIG. 1.

FIG. 7 shows a fourth example of operation of the resource management device of FIG. 1. In this example, if any of the accessible amounts 153, 154 and 155 exceeds a threshold (96 bytes, for example), the accessible amount in question is initialized.

Referring to FIG. 7, at T40, the master A receives the access permission 163 under the periodic arbitration. While the master A is granted 32 bytes in this access permission, the access request amount 166 of the master A is 8 bytes. The accessible amount 153 for the master A at T40 therefore becomes 24 bytes.

Likewise, at T41, T42 and T43, the master A receives the access permission 163 under the periodic arbitration. With the access request amount 166 of the master A being 8 bytes for each access permission, the accessible amount 153 for the master A at T43 is accumulated to 96 bytes.

At T44, also, the master A receives the access permission 163 under the periodic arbitration. While the master A is granted 32 bytes in this access permission, the access request amount 166 of the master A is 8 bytes. Since the accessible amount 153 for the master A is already 96 bytes, the renewed accessible amount 153 for the master A will exceed the threshold, that is, 96 bytes. In this case, therefore, the accessible amount 153 for the master A is initialized to 0 bytes.

Figure 8:
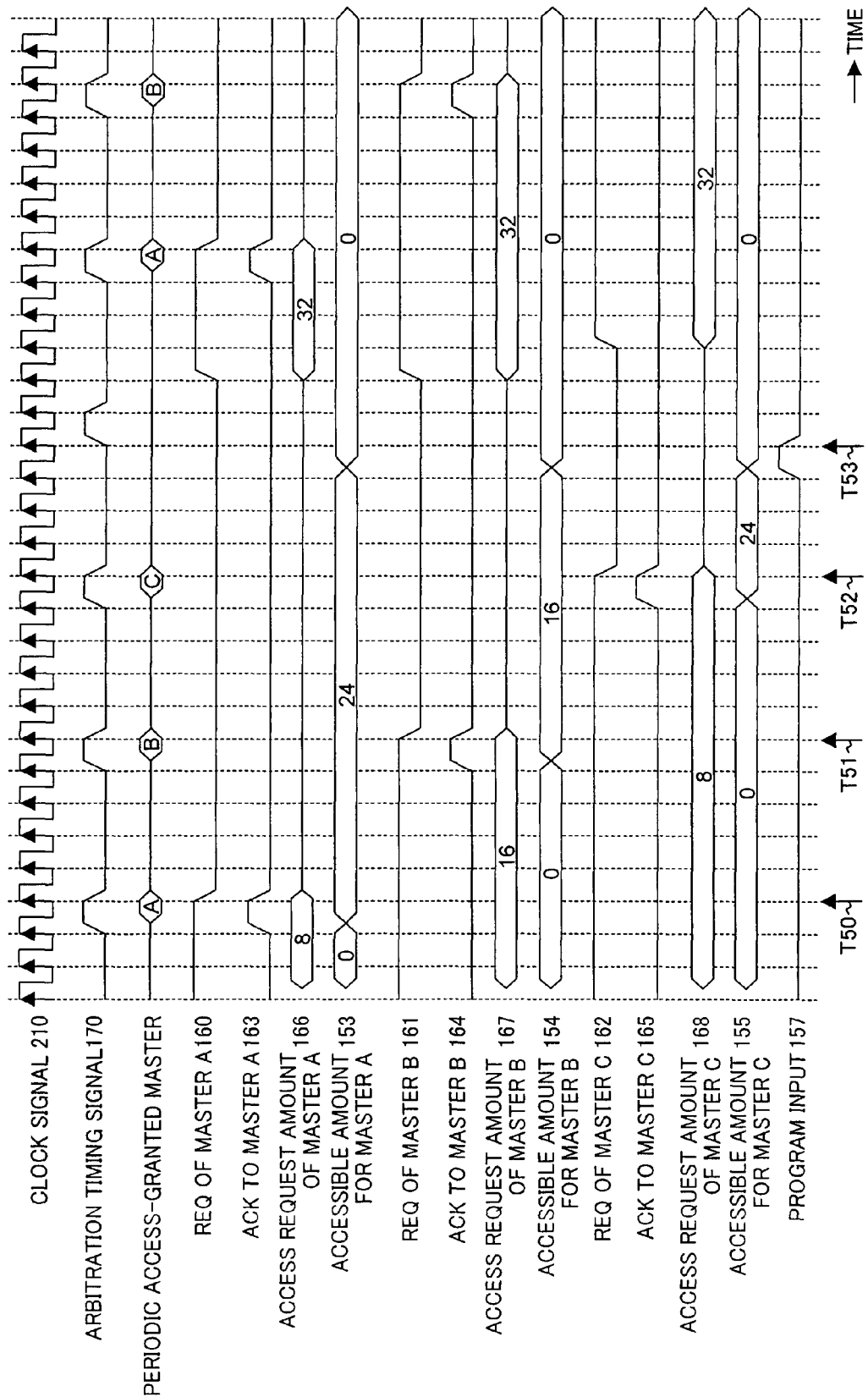
FIG. 8 is a timing chart showing a fifth example of operation of the resource management device of FIG. 1.

FIG. 8 shows a fifth example of operation of the resource management device of FIG. 1. In this example, the accessible amounts 153, 154 and 155 are initialized with the program input 157.

Referring to FIG. 8, at T50, the master A receives the access permission 163 under the periodic arbitration. While the master A is granted 32 bytes in this access permission, the access request amount 166 of the master A is 8 bytes. The accessible amount 153 for the master A at T50 therefore becomes 24 bytes.

At T51, the master B receives the access permission 164 under the periodic arbitration. While the master B is granted 32 bytes in this access permission, the access request amount 167 of the master B is 16 bytes. The accessible amount 154 for the master B at T51 therefore becomes 16 bytes.

At T52, the master C receives the access permission 165 under the periodic arbitration. While the master C is granted 32 bytes in this access permission, the access request amount 168 of the master C is 8 bytes. The accessible amount 155 for the master C at T52 therefore becomes 24 bytes.

At T53, a register initialization signal is issued via the program input 157 to the accessible amount registers 300, 301 and 302, to initialize the accessible amounts 153, 154 and 155 to 0 bytes from their respective values. Alternatively, any of the accessible amount registers 300, 301 and 302 may be specified as an object to be initialized via the program input 157.

Although the accessible amounts 153, 154 and 155 were initialized to 0 bytes in the above description, they may be initialized to a value other than 0.

Figure 9:
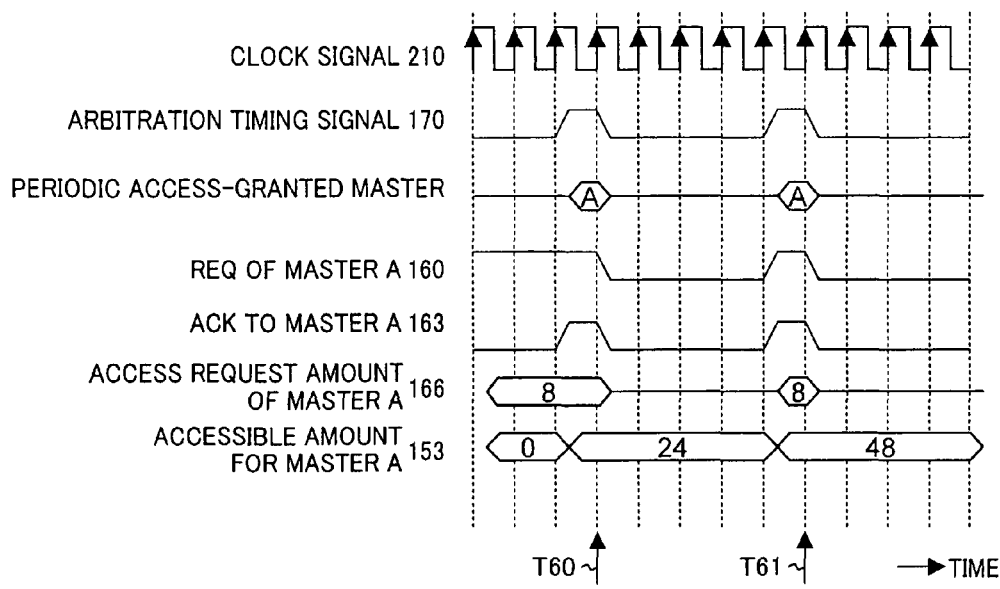
FIG. 9 is a timing chart showing a sixth example of operation of the resource management device of FIG. 1.

FIG. 9 shows a sixth example of operation of the resource management device of FIG. 1. In this example, priority is given to the periodic arbitration when the timing coincides between the periodic arbitration and the arbitrary arbitration.

Referring to FIG. 9, at T60, the master A receives the access permission 163. In this access permission, which results from arbitration by the periodic arbitration portion 200, the master A is granted 32 bytes. Since the access request amount 166 of the master A is 8 bytes, the accessible amount 153 for the master A at T60 becomes 24 bytes.

At T61, the master A issues the access request 160 to the access request arbitration section 103. The timing T61 coincides with the arbitration timing at which the periodic arbitration portion 200 executes arbitration. The periodic arbitration portion 200 therefore issues access permission for the master A to the arbitration result selection portion 204. At T61, also, the access request amount 166 of the master A, which is 8 bytes, is not more than the accessible amount 153 for the master A, which is 24 bytes. An arbitration request is therefore issued to the arbitrary arbitration portion 203, which then issues access permission for the master A to the arbitration result selection portion 204. The arbitration result selection portion 204, receiving the arbitration results from both the periodic arbitration portion 200 and the arbitrary arbitration portion 203, enables the arbitration result from the periodic arbitration portion 200. The arbitration result selection portion 204 then issues the access permission 163 to the master A, and also issues, to the data amount management section 104, the ID 150 of the access-granted master, the access request amount 151 of the access-granted master and the arbitration type 152 for access permission indicating that the arbitration result is from the periodic arbitration portion 200. The data amount management section 104 sets the accessible amount 153 at T61 at (accessible amount+32 bytes−access request amount) based on the information that arbitration has been made by the periodic arbitration portion 200.

Figure 10:
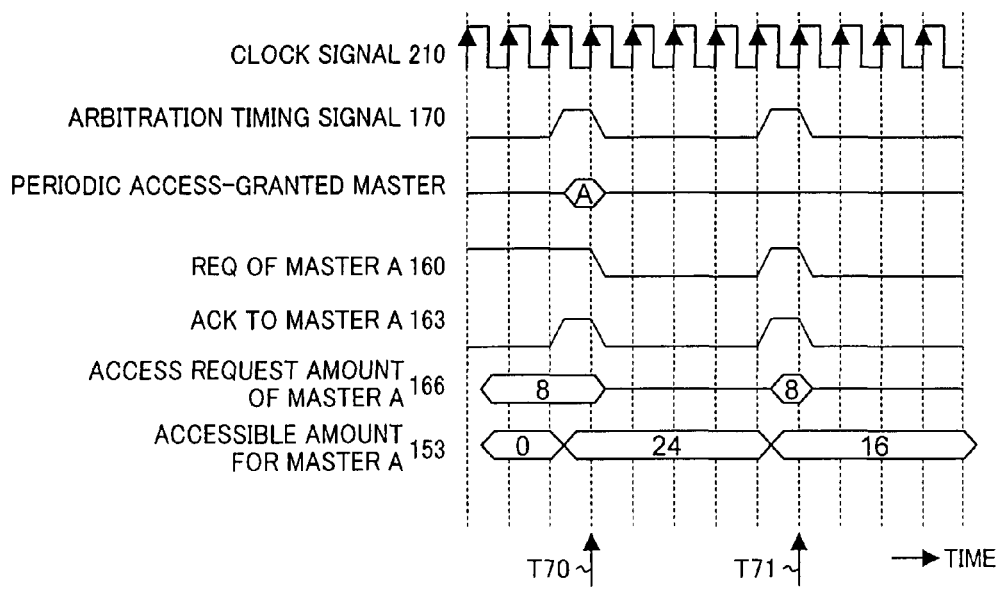
FIG. 10 is a timing chart showing a seventh example of operation of the resource management device of FIG. 1.

FIG. 10 shows a seventh example of operation of the resource management device of FIG. 1. In this example, priority is given to the arbitrary arbitration when the timing coincides between the periodic arbitration and the arbitrary arbitration.

Referring to FIG. 10, at T70, the master A receives the access permission 163. In this access permission, which results from arbitration by the periodic arbitration portion 200, the master A is granted 32 bytes. Since the access request amount 166 of the master A is 8 bytes, the accessible amount 153 for the master A at T70 becomes 24 bytes.

At T71, the master A issues the access request 160 to the access request arbitration section 103. The timing T71 coincides with the arbitration timing at which the periodic arbitration portion 200 executes arbitration. The periodic arbitration portion 200 therefore issues access permission for the master A to the arbitration result selection portion 204. At T71, also, the access request amount 166 of the master A, which is 8 bytes, is not more than the accessible amount 153 for the master A, which is 24 bytes. An arbitration request is therefore issued to the arbitrary arbitration portion 203, which then issues access permission for the master A to the arbitration result selection portion 204.

The arbitration result selection portion 204, receiving the arbitration results from both the periodic arbitration portion 200 and the arbitrary arbitration portion 203, enables the arbitration result from the arbitrary arbitration portion 203. The arbitration result selection portion 204 then issues the access permission 163 to the master A, and also issues, to the data amount management section 104, the ID 150 of the access-granted master, the access request amount 151 of the access-granted master and the arbitration type 152 for access permission indicating that the arbitration result is from the arbitrary arbitration portion 203. The data amount management section 104 sets the accessible amount 154 at T71 at (accessible amount−access request amount) based on the information that arbitration has been made by the arbitrary arbitration portion 203.

Figure 11:
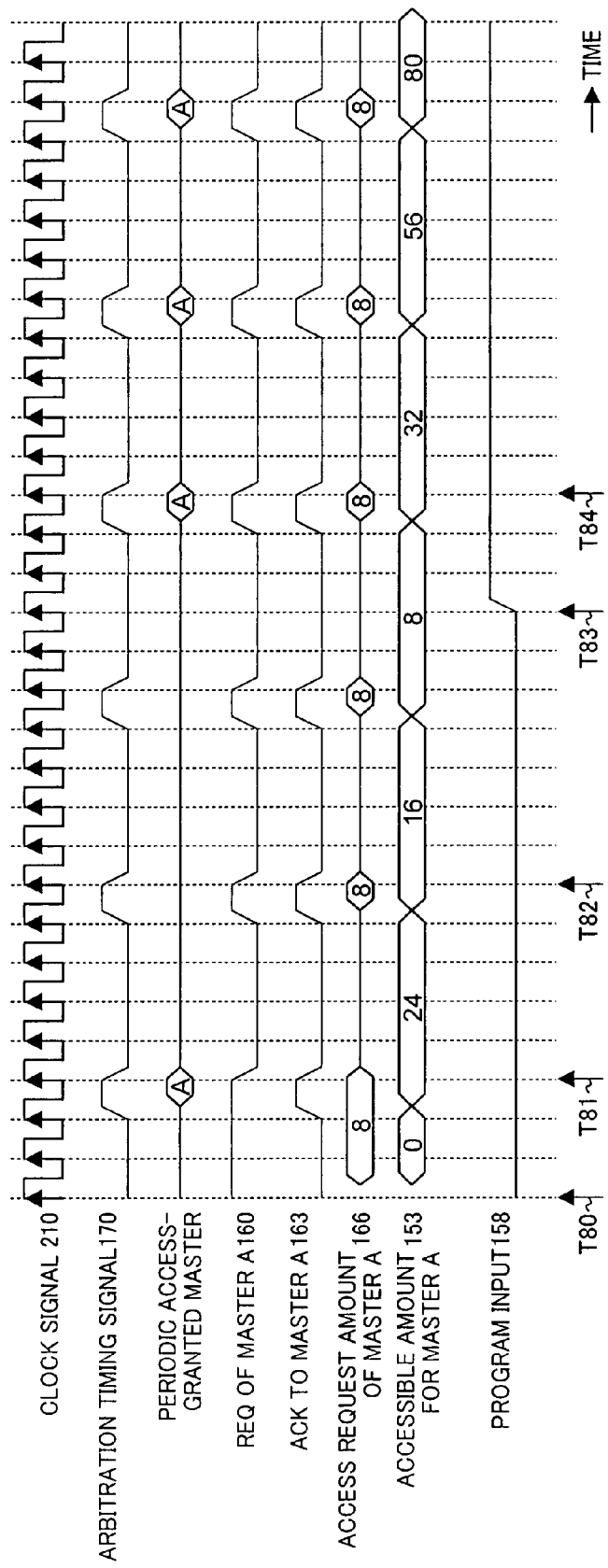
FIG. 11 is a timing chart showing an eighth example of operation of the resource management device of FIG. 1.

FIG. 11 shows an eighth example of operation of the resource management device of FIG. 1. In this example, when the timing coincides between the periodic arbitration and the arbitrary arbitration, the program input 158 is used to determine which arbitration result should be enabled.

Referring to FIG. 11, at T80, the program input 158 is given to turn the arbitration result selection signal to "0" so that the arbitration result selection portion 204 selects the result from the arbitrary arbitration portion 203.

At T81, the master A receives the access permission 163. In this access permission, which results from arbitration by the periodic arbitration portion 200, the master A is granted 32 bytes. Since the access request amount 166 of the master A is 8 bytes, the accessible amount 153 for the master A at T81 becomes 24 bytes.

At T82, the master A issues the access request 160 to the access request arbitration section 103. The timing T82 coincides with the arbitration timing at which the periodic arbitration portion 200 executes arbitration. The periodic arbitration portion 200 therefore issues access permission for the master A to the arbitration result selection portion 204. At T82, also, the access request amount 166 of the master A, which is 8 bytes, is not more than the accessible amount 153 for the master A, which is 24 bytes. An arbitration request is therefore issued to the arbitrary arbitration portion 203, which then issues access permission for the master A to the arbitration result selection portion 204. The arbitration result selection portion 204, receiving the arbitration results from both the periodic arbitration portion 200 and the arbitrary arbitration portion 203, enables the arbitration result from the arbitrary arbitration portion 203 according to the setting with the program input 158. The arbitration result selection portion 204 then issues the access permission 163 to the master A, and also issues, to the data amount management section 104, the ID 150 of the access-granted master, the access request amount 151 of the access-granted master and the arbitration type 152 for access permission indicating that the arbitration result is from the arbitrary arbitration portion 203. The data amount management section 104 sets the accessible amount 153 at T82 at (accessible amount−access request amount) since the arbitration has been made by the arbitrary arbitration portion 203.

At T83, the program input 158 is given to turn the arbitration result selection signal to "1" so that the arbitration result selection portion 204 selects the result from the periodic arbitration portion 200.

At T84, the master A issues the access request 160 to the access request arbitration section 103. The time T84 coincides with the arbitration timing at which the periodic arbitration portion 200 executes arbitration. The periodic arbitration portion 200 therefore issues access permission for the master A to the arbitration result selection portion 204. At T84, also, since the access request amount 166 of the master A is 8 bytes and the accessible amount 153 for the master A is 8 bytes, an arbitration request is issued to the arbitrary arbitration portion 203, which then issues access permission for the master A to the arbitration result selection portion 204. The arbitration result selection portion 204, receiving the arbitration results from both the periodic arbitration portion 200 and the arbitrary arbitration portion 203, enables the arbitration result from the periodic arbitration portion 200 according to the setting with the program input 158. The arbitration result selection portion 204 then issues the access permission 163 to the master A, and also issues, to the data amount management section 104, the ID 150 of the access-granted master, the access request amount 151 of the access-granted master and the arbitration type 152 for access permission indicating that the arbitration result is from the periodic arbitration portion 200. The data amount management section 104 sets the accessible amount 153 at T84 at (accessible amount+32 bytes−access request amount) since the arbitration has been made by the periodic arbitration portion 200.

Figure 12:
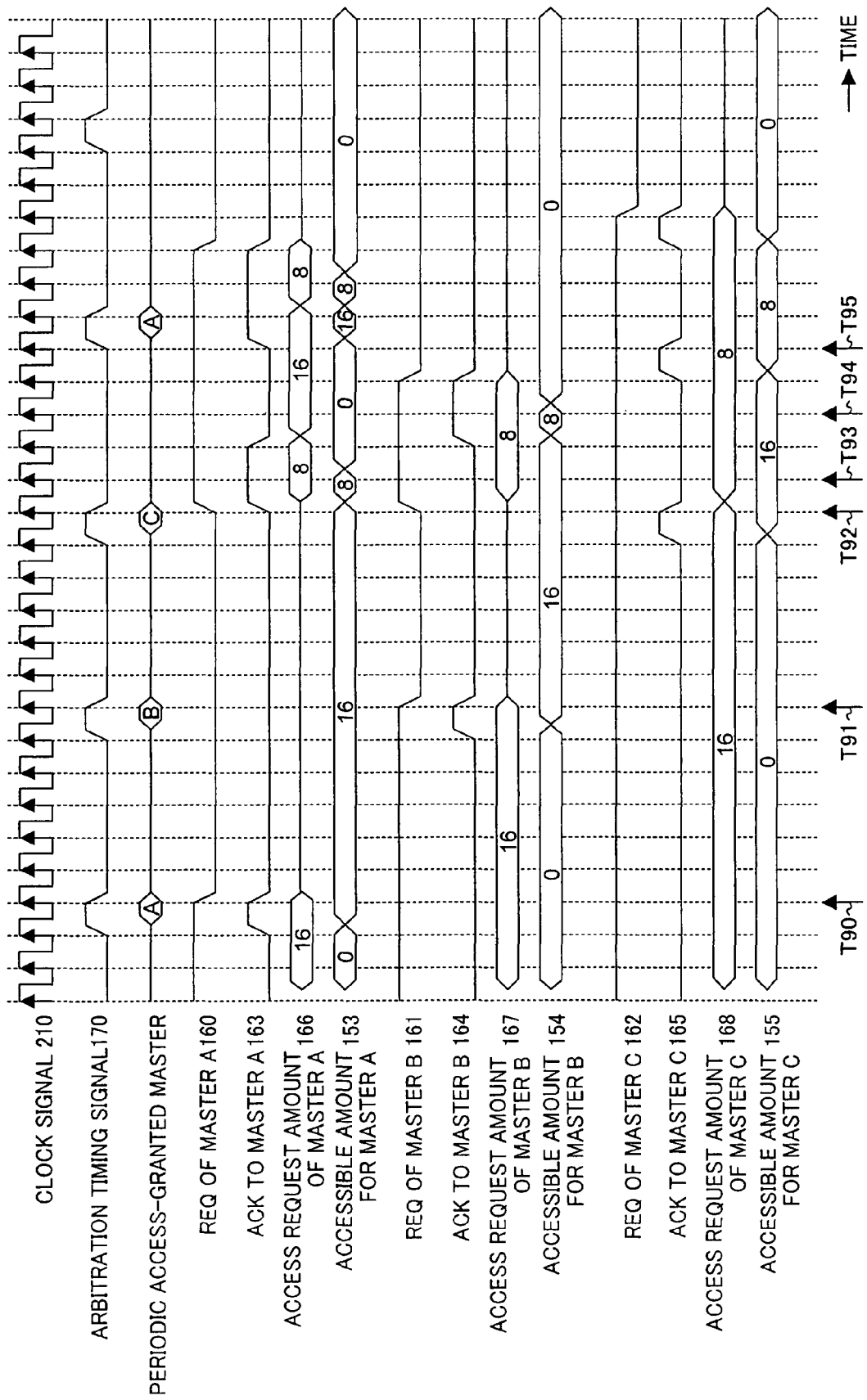
FIG. 12 is a timing chart showing a ninth example of operation of the resource management device of FIG. 1.

FIG. 12 shows a ninth example of operation of the resource management device of FIG. 1. In this example, when a plurality of arbitration requests are issued to the arbitrary arbitration portion 203 simultaneously, arbitration is made according to a fixed priority order. Assume herein that the master A has the highest priority and the master C has the lowest priority in the arbitrary arbitration portion 203. Assume also that the clock signal 210 is frequency-divided by six to give the arbitration timing signal 170.

Referring to FIG. 12, at T90, the master A receives the access permission 163 under the periodic arbitration. While the master A is granted 32 bytes in this access permission, the access request amount 166 of the master A is 16 bytes. The accessible amount 153 for the master A at T90 therefore becomes 16 bytes.

Likewise, at T91 and T92, the masters B and C respectively receive the access permissions 164 and 165 under the periodic arbitration, and as a result, both the accessible amounts 154 and 155 for the masters B and C become 16 bytes.

At T93, the masters A, B and C respectively issue their access requests 160, 161 and 162 to the access request arbitration section 103. Since T93 does not coincide with the arbitration timing, the periodic arbitration portion 200 performs no arbitration, but only the arbitrary arbitration portion 203 performs arbitration. As for the master A, the access request amount 166 is 8 bytes while the accessible amount 153 is 16 bytes, permitting issuance of an arbitration request to the arbitrary arbitration portion 203. Likewise, as for the masters B and C, the access request amounts 167 and 168 are respectively not more than the accessible amounts 154 and 155, permitting issuance of arbitration requests to the arbitrary arbitration portion 203. These arbitration requests to the arbitrary arbitration portion 203 are arbitrated according to the fixed priority order. At T93, therefore, the access permission 163 is issued to the master A.

At T94, the masters A, B and C issue their access requests 160, 161 and 162 to the access request arbitration section 103. Since T94 does not coincide with the arbitration timing, the periodic arbitration portion 200 performs no arbitration, but only the arbitrary arbitration portion 203 performs arbitration. As for the master A, the access request amount 166 is 8 bytes while the accessible amount 153 is 0 bytes. No arbitration request of the master A is therefore issued to the arbitrary arbitration portion 203. As for the masters B and C, the access request amounts 167 and 168 are respectively not more than the accessible amounts 154 and 155, permitting issuance of arbitration requests to the arbitrary arbitration portion 203. At T94, therefore, the access permission 164 is issued to the master B according to the fixed priority order.

At T95, the masters A and C issue their access requests 160 and 162 to the access request arbitration section 103. Since T95 does not coincide with the arbitration timing, the periodic arbitration portion 200 performs no arbitration, but only the arbitrary arbitration portion 203 performs arbitration. As for the master A, since the access request amount 166 exceeds the accessible amount 153, no arbitration request is issued to the arbitrary arbitration portion 203. As for the master C, the access request amount 168 is not more than the accessible amount 155, permitting issuance of an arbitration request to the arbitrary arbitration portion 203. At T95, therefore, the access permission 165 is issued to the master C according to the fixed priority order.

Figure 13:
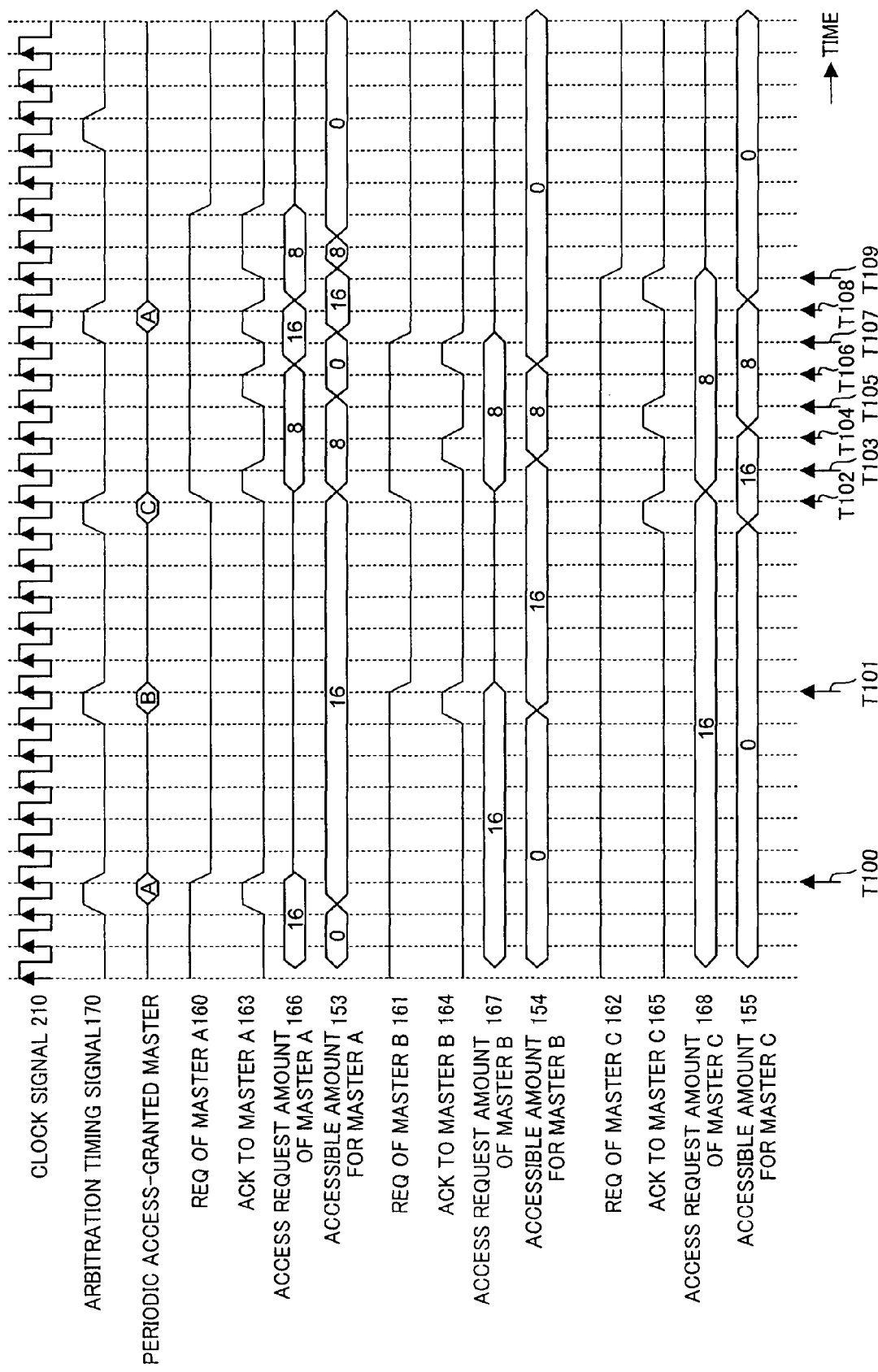
FIG. 13 is a timing chart showing a tenth example of operation of the resource management device of FIG. 1.

FIG. 13 shows a tenth example of operation of the resource management device of FIG. 1. In this example, when a plurality of arbitration requests are issued to the arbitrary arbitration portion 203 simultaneously, arbitration is made in a round-robin scheme.

Referring to FIG. 13, at T100, the master A receives the access permission 163 under the periodic arbitration. While the master A is granted 32 bytes in this access permission, the access request amount 166 of the master A is 16 bytes. The accessible amount 153 for the master A at T100 therefore becomes 16 bytes.

Likewise, at T101 and T102, the masters B and C respectively receive the access permissions 164 and 165 under the periodic arbitration, and as a result, both the accessible amounts 154 and 155 for the masters B and C become 16 bytes.

At T103, the masters A, B and C respectively issue their access requests 160, 161 and 162 to the access request arbitration section 103. Since T103 does not coincide with the arbitration timing, the periodic arbitration portion 200 performs no arbitration, but only the arbitrary arbitration portion 203 performs arbitration. As for the master A, the access request amount 166 is 8 bytes while the accessible amount 153 is 16 bytes, permitting issuance of an arbitration request to the arbitrary arbitration portion 203. Likewise, as for the masters B and C, the access request amounts 167 and 168 are respectively not more than the accessible amounts 154 and 155, permitting issuance of an arbitration request to the arbitrary arbitration portion 203. These arbitration requests to the arbitrary arbitration portion 203 are arbitrated in the round-robin scheme. At T103, therefore, the access permission 163 is issued to the master A.

At T104, the masters A, B and C issue their access requests 160, 161 and 162 to the access request arbitration section 103. Since T104 does not coincide with the arbitration timing, the periodic arbitration portion 200 performs no arbitration, but only the arbitrary arbitration portion 203 performs arbitration. As for the masters A, B and C, the access request amounts 166, 167 and 168 are not more than the corresponding accessible amounts 153, 154 and 155, permitting issuance of arbitration requests to the arbitrary arbitration portion 203. Since the master A was the one selected in the arbitration at T103, the access permission 164 is issued to the master B at T104 in the round-robin scheme.

Likewise, at T105, the masters A, B and C issue their access requests 160, 161 and 162 to the access request arbitration section 103. Since the master B was the one selected in the arbitration at T104, the access permission 165 is issued to the master C at T105 in the round-robin scheme.

Thereafter, in a similar way, the access permissions 163 and 164 are issued to the masters A and B at T106 and T107, respectively.

At T108, the master A receives the access permission 163 under the periodic arbitration. While the master A is granted 32 bytes in this access permission, the access request amount 166 of the master A is 16 bytes. The accessible amount 153 for the master A at T108 therefore becomes 16 bytes.

At T109, the masters A and C issue their access requests 160 and 162 to the access request arbitration section 103. Since T109 does not coincide with the arbitration timing, the periodic arbitration portion 200 performs no arbitration, but only the arbitrary arbitration portion 203 performs arbitration. The access request amounts 166 and 168 of the masters A and C are respectively not more than the accessible amounts 153 and 155, permitting issuance of arbitration requests to the arbitrary arbitration portion 203. Since the master B was the one selected in the arbitration at T107, the access permission 165 is issued to the master C at T109 in the round-robin scheme.

Figure 14:
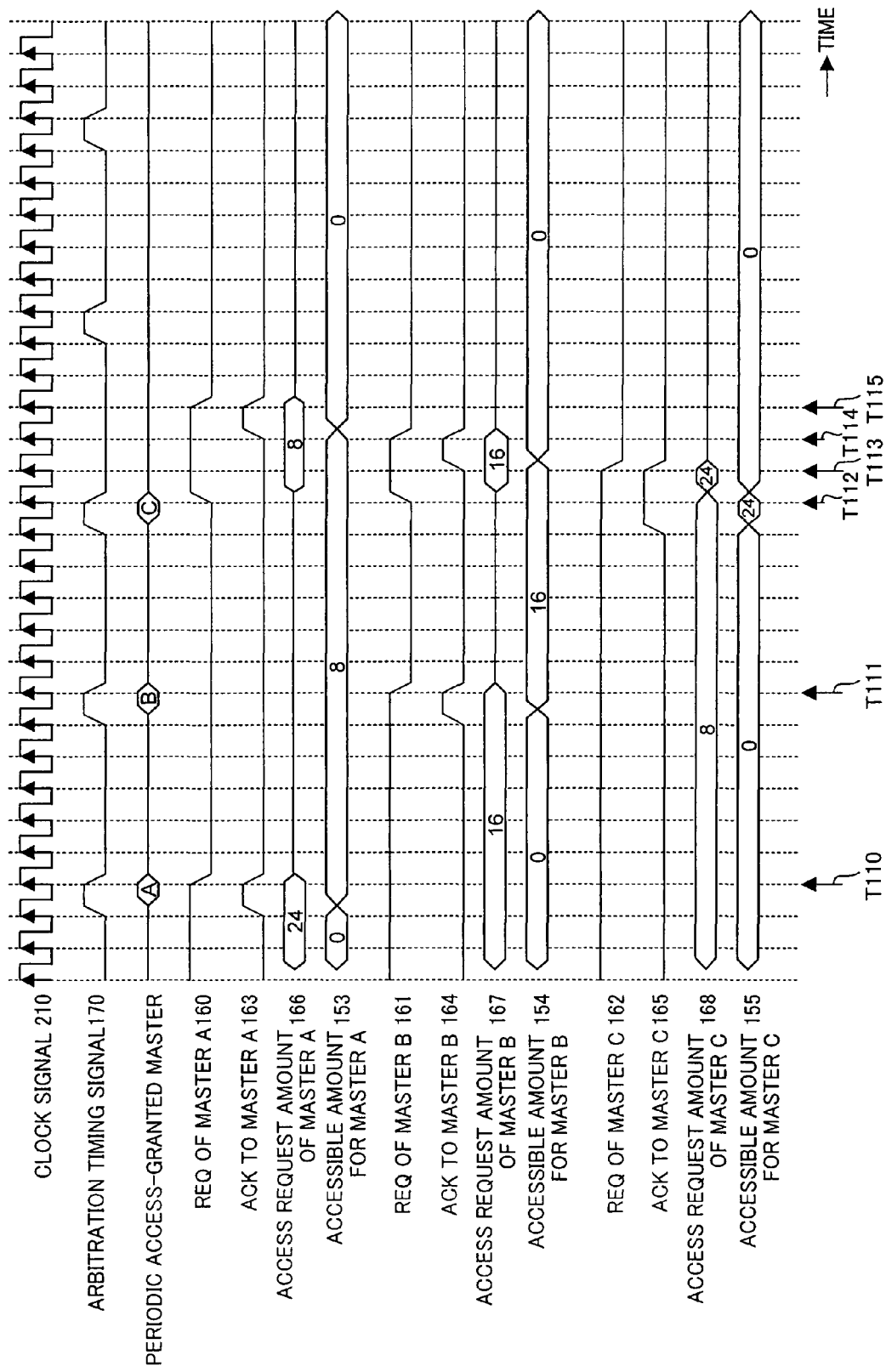
FIG. 14 is a timing chart showing an eleventh example of operation of the resource management device of FIG. 1.

FIG. 14 shows an eleventh example of operation of the resource management device of FIG. 1. In this example, when a plurality of arbitration requests are issued to the arbitrary arbitration portion 203 simultaneously, access permission is issued to a master largest in accessible amount.

Referring to FIG. 14, at T110, the master A receives the access permission 163 under the periodic arbitration. While the master A is granted 32 bytes in this access permission, the access request amount 166 of the master A is 24 bytes. The accessible amount 153 for the master A at T110 therefore becomes 8 bytes.

Likewise, at T111 and T112, the masters B and C respectively receive the access permissions 164 and 165 under the periodic arbitration, and as a result, the accessible amounts 154 and 155 for the masters B and C respectively become 16 bytes and 24 bytes.

At T113, the masters A, B and C respectively issue their access requests 160, 161 and 162 to the access request arbitration section 103. Since T113 does not coincide with the arbitration timing, the periodic arbitration portion 200 performs no arbitration, but only the arbitrary arbitration portion 203 performs arbitration. As for the master A, the access request amount 166 is 8 bytes while the accessible amount 153 is 8 bytes, permitting issuance of an arbitration request to the arbitrary arbitration portion 203. Likewise, as for the masters B and C, the access request amounts 167 and 168 are respectively not more than the accessible amounts 154 and 155, permitting issuance of arbitration requests to the arbitrary arbitration portion 203. Since these arbitration requests to the arbitrary arbitration portion 203 are arbitrated according to the rule of granting access permission to a master largest in accessible amount, the access permission 165 is issued to the master C whose corresponding accessible amount is 24 bytes at T113.

At T114, the masters A and B issue their access requests 160 and 161 to the access request arbitration section 103. Since T114 does not coincide with the arbitration timing, the periodic arbitration portion 200 performs no arbitration, but only the arbitrary arbitration portion 203 performs arbitration. The access request amounts 166 and 167 of the masters A and B are not more than the corresponding accessible amounts 153 and 154, permitting issuance of arbitration requests to the arbitrary arbitration portion 203. Since the accessible amount for the master B is larger than that for the master A, the access permission 164 is issued to the master B at T114.

At T115, only the master A issues the access request 160 to the access request arbitration section 103. The access permission 163 is therefore issued to the master A by the arbitrary arbitration portion 203.

Although three masters A, B and C were used in FIG. 1, any given number of masters may be used. Also, although one shared resource 106 was connected to the masters A, B and C, any given number of resources may be connected.

Although the three accessible amount registers 300, 301 and 302 were used in FIG. 3, the number of registers may be changed according to the number of masters. Also, although one accessible amount computation portion 304 was provided, such an accessible amount computation portion may be provided for each master.

As described above, according to the resource management device of the present invention, the access efficiency and the access latency can be improved in a system in which the access request amounts of masters are not uniform. Such a resource management device is therefore especially useful for video/audio recording systems for digital TV broadcasting and the like.

While the present invention has been described in preferred embodiments, it will be apparent to those skilled in the art that the disclosed invention may be modified in numerous ways and may assume many embodiments other than those specifically set out and described above. Accordingly, it is intended by the appended claims to cover all modifications of the invention which fall within the true spirit and scope of the invention.

What is claimed is:

1. A resource management device in a system in which a plurality of masters share at least one resource, the device comprising:

an access request arbitration section for arbitrating access requests from the plurality of masters;

a data amount management section for managing accessible amounts passing between the plurality of masters and the resource with respect to each of the plurality of masters; and a resource control section for controlling passing of data between a master granted access by the access request arbitration section and the resource, wherein the access request arbitration section executes periodic arbitration of issuing access permission to any of the plurality of masters at fixed-interval arbitration timing and arbitrary arbitration of issuing access permission to a master among the plurality of masters presenting an access request amount that does not exceed the accessible amount managed by the data amount management section at any timing, and when an access by a first master of the plurality of masters is permitted at the periodic arbitration by the access request arbitration section, the data amount management section determines, from an accessible amount for the first master and an access request amount of the first master, an accessible amount for the first master at the arbitrary arbitration in a next cycle.

2. The device of claim 1, wherein the data amount management section initializes respective accessible amounts managed for the plurality of masters, and thereafter in the case of the periodic arbitration, increases the accessible amount for an access-granted master by a defined data amount and then decreases the resultant accessible amount by the equivalent of the access request amount of the access-granted master, or in the case of the arbitrary arbitration, decreases the accessible amount for an access-granted master by the equivalent of the access request amount of the access-granted master, and the access request arbitration section issues access permission to a master presenting an access request amount that does not exceed the accessible amount managed by the data amount management section in the arbitrary arbitration.

3. The device of claim 2, wherein the data amount management section reinitializes any of the accessible amounts for the plurality of masers under certain conditions to avoid the accessible amounts for the plurality of masters from becoming excessively large.

4. The device of claim 3, wherein the data amount management section reinitializes the accessible amount for any master other than a master granted access in the last periodic arbitration every time the periodic arbitration is executed a predetermined number of times.

5. The device of claim 3, wherein the data amount management section reinitializes all of the accessible amounts for the plurality of masters based on an interrupt signal issued from the resource.

6. The device of claim 3, wherein the data amount management section reinitializes a given accessible amount among the accessible amounts for the plurality of masters when the given accessible amount exceeds a predetermined threshold.

7. The device of claim 3, wherein the data amount management section receives a program input for initializing some of the accessible amounts for the plurality of masters at any timing.

8. The device of claim 2, wherein the access request arbitration section issues access permission to a single master determined according to a predetermined priority rule when a plurality of masters presents access request amounts that do not exceed their corresponding accessible amounts managed by the data amount management section.

9. The device of claim 8, wherein the priority rule is a rule based on a fixed priority order among the plurality of masters.

10. The device of claim 8, wherein the priority rule is a rule of a round-robin scheme in which the priority order among the plurality of masters is changed sequentially.

11. The device of claim 8, wherein the priority rule is a rule based on a priority order among the plurality of masters determined individually according to largeness of the accessible amounts for the plurality of masters.

12. The device of claim 1, wherein the access request arbitration section enables the periodic arbitration when the timing coincides between the periodic arbitration and the arbitrary arbitration.

13. The device of claim 1, wherein the access request arbitration section enables the arbitrary arbitration when the timing coincides between the periodic arbitration and the arbitrary arbitration.

14. The device of claim 1, wherein the access request arbitration section receives a program input for specifying which one, the periodic arbitration or the arbitrary arbitration, should be enabled when the timing coincides between the periodic arbitration and the arbitrary arbitration.

15. The device of claim 1, wherein when an access by a second master of the plurality of masters is permitted at the periodic arbitration by the access request arbitration section, the data amount management section calculates, from an accessible amount for the second master and an access request amount of the second master, an accessible amount for the second master at the arbitrary arbitration in a next cycle.

* * * * *